(12) United States Patent
Nezat, II

(10) Patent No.: US 6,764,604 B1
(45) Date of Patent: Jul. 20, 2004

(54) SEWER LINE PUMPING SYSTEM

(76) Inventor: Malvin A. Nezat, II, P.O. Box 1419, Splendora, TX (US) 77372

( * ) Notice: Subject to any disclaimer, the term of this patent is extended or adjusted under 35 U.S.C. 154(b) by 4 days.

(21) Appl. No.: 10/075,421

(22) Filed: Feb. 14, 2002

(51) Int. Cl.[7] .............................................. B01D 21/02
(52) U.S. Cl. ........................ 210/800; 210/805; 210/167; 210/416.1; 210/532.1
(58) Field of Search ................................ 210/167, 513, 210/532.1, 533, 800, 801, 805, 416.1

(56) References Cited

U.S. PATENT DOCUMENTS

| | | | |
|---|---|---|---|
| 1,437,007 A | * 11/1922 | Otterson | 210/241 |
| 1,437,008 A | * 11/1922 | Otterson | 210/241 |
| 1,561,744 A | * 11/1925 | Raymond | 210/532.1 |
| 2,010,540 A | 8/1935 | Evans | |
| 2,522,077 A | * 9/1950 | Wahl et al. | 414/502 |
| 2,782,929 A | * 2/1957 | Colket | 210/532.1 |
| 3,463,172 A | * 8/1969 | Naylor | 134/169 R |
| 3,658,589 A | 4/1972 | Shaddock | |
| 3,842,461 A | 10/1974 | Wurster | |
| 4,134,174 A | 1/1979 | Flynn et al. | |
| 4,139,464 A | * 2/1979 | Coward | 210/805 |
| 4,234,980 A | 11/1980 | DiVito et al. | |
| 4,322,868 A | 4/1982 | Wurster | |
| 4,367,145 A | * 1/1983 | Simpson et al. | 210/241 |
| 4,381,996 A | * 5/1983 | Kugler et al. | 210/195.1 |
| 4,543,183 A | * 9/1985 | Petretti | 210/187 |
| 4,578,198 A | 3/1986 | Schmidt et al. | |
| 4,816,167 A | * 3/1989 | Vanderslice | 210/776 |
| 4,839,064 A | * 6/1989 | McBurney et al. | 210/806 |
| 4,906,366 A | * 3/1990 | Moore | 210/242.3 |
| 5,062,963 A | * 11/1991 | Marcinkowski et al. | 210/712 |
| 5,068,940 A | 12/1991 | Sheppard et al. | |
| 5,129,957 A | 7/1992 | Sheppard et al. | |
| 5,250,273 A | * 10/1993 | Hornsey et al. | 423/3 |
| 5,312,551 A | 5/1994 | Perron et al. | |
| 5,336,333 A | 8/1994 | Sheppard et al. | |
| 5,341,539 A | 8/1994 | Sheppard et al. | |
| 5,380,427 A | * 1/1995 | Foss | 210/95 |
| 5,401,261 A | * 3/1995 | Gunya et al. | 604/319 |
| 5,417,851 A | * 5/1995 | Yee | 210/167 |
| 5,503,753 A | * 4/1996 | Woodall et al. | 210/803 |
| 5,660,725 A | 8/1997 | Klass | |
| 5,946,767 A | 9/1999 | Sinz | |
| 6,013,138 A | 1/2000 | Sinz | |
| 6,391,198 B1 | * 5/2002 | Porter et al. | 210/241 |

* cited by examiner

Primary Examiner—Fred G. Prince
(74) Attorney, Agent, or Firm—Marsteller & Associates, P.C.

(57) ABSTRACT

A separation apparatus (A) for separating solids from a slurry of liquid and solids includes a separation tank (10). An intake assembly (12) communicates with the separation tank (10) for conveying the slurry through an entrance end (14) into an inlet (16) formed in the tank (10). An outlet assembly (18) communicates with the separation tank (10) for conveying decanted liquid (20) through an outlet (22) formed in the tank (10) to an exit end (24) of the outlet assembly (18) positioned in a desired location. A pump (26) is adapted to convey the decanted liquid (20) from the separation tank (10) through the outlet assembly (18). The tank (10), intake assembly (12), and outlet assembly (18) form an airtight, compartmented system when the entrance end (14) of the intake assembly (12) and the exit end (24) of the outlet assembly (18) are sealed.

16 Claims, 1 Drawing Sheet

SEWER LINE PUMPING SYSTEM

BACKGROUND OF THE INVENTION

1. Technical Field

The invention relates to the field of cleaning bodies of liquid slurries or waste collection systems, such as sewer lines, collection tanks, and in particular to cleaning and removing of solid and liquid materials therefrom.

2. Background Art

Separation systems are used generally by commercial sewer cleaning services for removing unwanted solids from a liquid slurry mixture found in sewer lines to unclog sewer lines or to increase fluid flow that has been restricted due to sediments forming in the sewer line or other debris clogging the pipeline.

Apparatus for cleaning sewers are known. For example, U.S. Pat. No. 5,068,940 teaches a truck mounted sewer cleaning system having the pump that moves the liquid slurry through the system ahead of the separation box in which solids are separated from the slurry.

Other known sewer cleaning systems use a centrifugal separator to separate solids from the liquid slurry. The centrifugal separators are utilized to separate the solids from liquids by centrifugal action, but do not act as a pump to move the slurry throughout the sewer cleaning system. Examples of centrifugal separators are U.S. Pat. Nos. 5,312,551, 4,322,868, and 4,134,174.

However, such a centrifugal pump arrangement after the settling container has not been used in the field of sewer cleaning apparatus. Placing a main pump in the fluid flow line after separation is done reduces the amount of abrasive material that travels through the pump, thereby extending the useful life of the pump.

While the above cited references introduce and disclose a number of noteworthy advances and technological improvements within the art, none completely fulfills the specific objectives achieved by this invention.

DISCLOSURE OF INVENTION

In accordance with the present invention, a separation apparatus for separating solids from a slurry of liquid and solids of the type found in sewers, ponds, and tanks includes a separation tank. An intake assembly communicates with the separation tank for conveying the slurry through an entrance end into an inlet formed in the tank.

An outlet assembly communicates with the separation tank for conveying decanted liquid in an outlet fluid flow line through an outlet formed in the tank to an exit end of the outlet assembly positioned in a desired location, either back into the sewer system or otherwise. A pump mounted in an outlet fluid flow line is adapted to convey the decanted liquid from the separation tank through the outlet assembly. The tank, intake assembly, and outlet assembly form an airtight, compartmented system when the entrance end of the intake assembly and the exit end of the outlet assembly are sealed.

Unlike the prior art devises, having the pump in the fluid flow path after at least some of the solids separated or precipitated from the slurry reduces the potential for wear of or damage to the pump that draws the fluid or slurry through the separation system.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

MODE(S) FOR CARRYING OUT THE INVENTION

Figure 1:
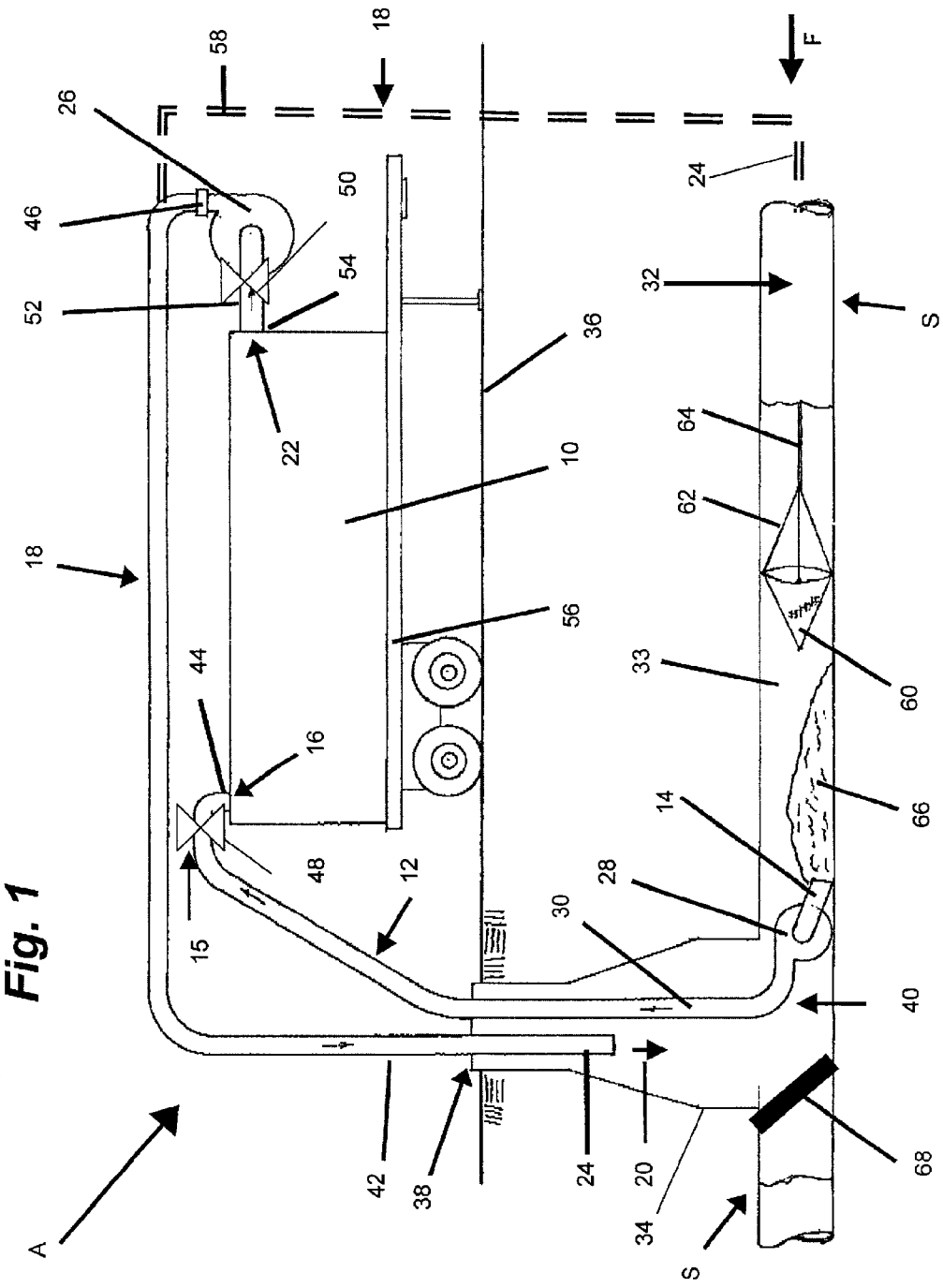
FIG. 1 is a schematic diagram is a schematic diagram of an embodiment of the system and a method of the present invention.

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

A separation apparatus (A) for separating solids from a slurry of liquid and solids of the type found in sewers (S), ponds, or tanks includes a separation tank (10). An intake assembly (12) communicates with the separation tank (10) for conveying the slurry through a tank entrance end (15) into an inlet (16) formed in the tank (10). An outlet assembly (18) communicates with the separation tank (10) for conveying decanted liquid (20) in an outlet fluid flow line (42) through an outlet (22) formed in the tank (10) to an exit end (24) of the outlet assembly (18) positioned in a desired location. A main or primary pump (26) mounted in the fluid flow outlet line (18) is adapted to convey the decanted liquid (20) from the separation tank (10) through the outlet assembly (18). The tank (10), intake assembly (12), and outlet assembly (18) form an airtight, compartmented system when the entrance end (14) of the intake assembly (12) and the exit end (24) of the outlet assembly (18) are sealed.

The main pump (26) in the outlet assembly or line (18) is preferably a centrifugal type of pump. Alternatively, a hydraulic, pneumatic or any other suitable type of pump may be used.

The intake assembly or line (12) may further include a secondary intake pump (28) for conveying the slurry through the intake assembly (12) and into the separation tank (10). The entrance end (14) of the intake assembly or line (12) is in fluid communication with the optional secondary pump (28). An intake hose (30) communicates the slurry into the separation tank (10) through the inlet (16) connection of the separation tank (10).

The entrance end (14) is placed within the source of the slurry to be separated. This may be a lake, pool, or a sewer system (S). The sewer system typically includes a main pipe (32) having an interior or open passageway (33) therethrough, and an access line (34) with a surface mounted manhole or access point (38). The interior compartment (40) formed at the junction of the main pipe (32) and access line (34) generally is suitable for drawing the slurry from the sewer system (S). The fluid generally flows in the direction of travel through the sewer or piping system along the flow direction (F).

The intake assembly (12) preferably includes a compatible hose or tube (30), such as a flexible pipe or tube.

Similarly, the outlet assembly (18) includes a hose (42). Both hoses (30 and 42) should be chosen to be suitable for the type of liquid or slurry, such as being selected for the ability to resist abrasion or acidity, and flexibility characteristics, and also sized to be appropriate for the amount of fluid flow therethrough. Preferably, the intake hose (30) and outlet hose (42) are detachable from the separator tank unit. For example intake hose can be removably coupled to the separator tank (10 by coupling (44). Outlet hose (42) can be removably coupled to the main pump (26) with coupling (46).

Preferably, the intake and outlet assemblies (12 and 18) and the separation tank (10) form a sealed unit to maximize the efficacy of the primary pump (26) pulling the liquid through the system (A) of the present invention. While the system does not need to be completely hermetically sealed, a better seal improves the pumping ability of the main pump (26) in the outlet or discharge side of the system.

The intake assembly (12) optionally includes a known type of flow control valve (48) that may be used to control the amount of fluid flow through the present invention or to shut off and seal the inlet or intake side of the separation tank (10) against undesired fluid flow back-flowing out of the tank (10). Similarly, the outlet or discharge assembly (18) may include a flow control valve (50) to prevent undesired fluid flow out-flowing from the separation tank (10).

A short portion of hose (52) optionally connects the main pump (26) to the outlet (22) of the separation tank (10). A detachable coupling (54) connecting the outlet or discharge assembly (18) to the separation tank (10) may be used to easily disconnect the separation tank (10) from the outlet assembly (18).

Alternatively, the separation tank may be mounted on a mobile carrier (56), such as a known flat bed truck or trailer.

The intake and outlet assemblies (12 and 18) are optionally removable from the separation tank. This improves transportability when the separation tank (10) is mounted on a mobile carrier (56) by making the separation tank (10) easy to take out of and to restore back into the cleaning system (A).

The intake assembly (12) of the present invention may be adapted to siphon slurry from a sewer line (S), lake or other body of water, a holding tank or any other source of standing or slowing liquid or gas carrying separable solids or particulate matter.

Placing an outlet or exit end (24) for at least a portion of the separated liquid ahead (upstream) of the intake into the intake assembly may be desirable to increase the fluid flow ahead of other known sewer cleaning apparatus, such as a kite (60) with its harness (62) and control line (64) shown in FIG. 1. The return tube or pipe (58) shown in phantom in FIG. 1 can optionally be connected into or with the outlet piping (42) the outlet assembly (18). In FIG. 1 the kite (60) is used to assist the operator with pushing the solid debris (66) downstream or in the direction of fluid flow (F) toward the entrance end (14) of the intake assembly (12) placed within the interior compartment (40) formed at the junction of the sewer access line (34) and sewer pipe (32).

The sewer cleaning kite (60) should preferably operate ahead of the intake end (14) that leads to the separator tank (10) in the path of the fluid in order that the pressure action of the kite (6) would tend to drive more undesired solids (66) toward the intake or inlet (14) into the separator system.

Optionally, a dam unit (68) can be placed within the sewer line (S) within or near the interior compartment (40). In one arrangement the dam (68) seals the sewer line downstream of the inlet (14) to cause the volume of the slurry and liquid to increase. In a second arrangement for the dam (68) the dam can be positioned standing within the opening (40) of sewer line (S) and the exit end (24) of the outlet assembly (18) discharging the decanted fluid (20) downstream of the dam (68) permitting the flow of the decanted fluid away from the dam and intake (14).

Method

The present invention includes a method for cleaning a source of slurry such as a type that is composed of liquid and solids. An intake assembly (12) is utilized for conveying the slurry into a separation tank (10). First, an entrance end (14) of the intake assembly (12) is placed into the source of slurry to be separated. The slurry is then conveyed into the separation tank (10) through the intake assembly (12) that is connected to the separation tank (10).

Solids from the slurry are separated in the separation tank (10) by settling or decanting the solids from the liquid. The decanted liquid is extracted from the separation tank (10) and is pumped through a main pump (26) located-in the flow path of the processed liquid through the outlet assembly (18) that is in fluid flow communication with the separation tank (10). The decanted water is then released through an exit end (24) of the outlet assembly (18) at a desired location.

The fluid flow begins with the fluid in the pipe or other type of source (S). A portion of the slurry is drawn into the intake assembly (12). The slurry flows through the intake assembly (12) communicating with the separator tank (10) and into the separator tank (10) itself.

Once in the separator tank (10) the slurry should precipitate or "give up" at least a portion of the solids (66) carried in the slurry mixture allowing the solids to separate or settle from the liquid due to the normal effects of gravity on the solids contained within the mixture.

The outlet assembly (18) in fluid communication with the separator box (10) then extracts the separated liquid from the separator box (10) and directs the separated liquid either back into the source of the slurry, either upstream or downstream of the intake for the system, or other location as chosen by the operator of the present invention. In FIG. 1 the outlet line (58) shown in phantom introduces the decanted fluid back into the sewer line upstream of or ahead of the intake entrance (14), while the solid discharge line (42) introduces the decanted fluid downstream or below the inlet (14) with respect to the direction of fluid flow (F).

Optionally, the separation tank (10) and other operable components may be mounted in a manner making them transportable. This would permit improved ability for replacement and cleaning of the separation tank (10). For example, the separation tank (10) may be mounted on a flat bed or trailer (56) of the type that can be pulled by a vehicle.

Once the separator tank (10) fills substantially with settled solids, the separator tank (10) may optionally be disconnected from the intake and outlet assemblies (12 and 18) and moved to a dumping site for removal of the collected solids. A second tank unit could be moved into position and connected to the intake and outlet assemblies, or the original tank once emptied can be reconnected within the system.

The above description of the present invention involved a slurry composed of a liquid, such as water, with separable solids. This is the type of slurry found in most sewer cleaning situations. However, the present invention is not limited to a liquid slurry, but is also useful in situations where a gas is mixed with separable solids, such as found in the cleaning of air duct work and the like. When a gas carries the solids to be separated, then the sealing of the present system has greater importance in the separation and fluid flow efficiency of the system.

The foregoing disclosure and description of the invention are illustrative and explanatory thereof, and various changes in the size, shape and materials, as well as in the details of the illustrated construction may be made without departing from the spirit of the invention.

What is claimed is:

1. A separation apparatus for separating solids from a slurry of liquid and solids of the type found in sewers, ponds, and tanks, comprising:

a separation tank mounted on a mobile carrier;

an intake assembly means for communicating with the separation tank for conveying the slurry through an entrance end into an inlet formed in the tank;

an outlet system assembly means communicating with the separation tank for conveying decanted liquid in an outlet fluid flow line through an outlet formed in the tank to an exit end positioned in a desired location;

a pump means mounted in the fluid outlet flow line adapted for conveying the decanted liquid from the separation tank and through the outlet system; and the tank, intake assembly, and outlet assembly form an airtight, compartmented system when the entrance end of the intake assembly and the exit end of the outlet assembly are sealed.

2. The invention of claim 1 wherein the pump is a centrifugal pump.

3. The invention of claim 1 wherein the pump is hydraulic.

4. The invention of claim 1 wherein the pump is pneumatic.

5. The invention of claim 1 wherein the intake assembly further includes an intake pump means for conveying the slurry.

6. The invention of claim 1 wherein the intake assembly includes a hose.

7. The invention of claim 1 wherein the outlet assembly includes a hose.

8. The invention of claim 1 wherein the intake assembly includes a flow control valve.

9. The invention of claim 1 wherein the outlet assembly includes a flow control valve.

10. The invention of claim 1 wherein the intake assembly siphons slurry from a sewer.

11. The invention of claim 1 where the intake and outlet assemblies are removable from the separation tank.

12. The invention of claim 1 where the intake and outlet assemblies, and the separation tank form a sealed unit.

13. A method for cleaning a source of slurry composed of liquid and solids utilizing an intake assembly for conveying the slurry into a separation tank, comprising the steps of:

placing an entrance end of the intake assembly into the source of slurry to be separated;

conveying the slurry into the separation tank through the intake assembly;

separating solids from the slurry in the separation tank mounted on a mobile carrier by settling the solids from the liquid;

extracting decanted liquid from the separation tank;

pumping the decanted liquid through a pump located in the flow path of the liquid through an outlet assembly in fluid flow communication with the separation tank; and releasing the decanted water through an exit end of the outlet assembly at a desired location, wherein the tank, intake assembly, and outlet assembly form an airtight, compartmented system when the entrance end of the intake assembly and the exit end of the outlet assembly are sealed.

14. The method of claim 13 wherein the pump is a centrifugal pump.

15. The method of claim 13 wherein the intake and outlet assemblies are removable from the separation tank.

16. The method of claim 13 wherein the intake assembly further includes an intake.

* * * * *